Jan. 16, 1940.  A. L. WALLACE  2,187,254
CONTINUOUS VULCANIZER
Original Filed March 16, 1935   2 Sheets-Sheet 1

A. L. Wallace  INVENTOR.
BY Thomas Howe
ATTORNEY.

Jan. 16, 1940.  A. L. WALLACE  2,187,254
CONTINUOUS VULCANIZER
Original Filed March 16, 1935   2 Sheets-Sheet 2
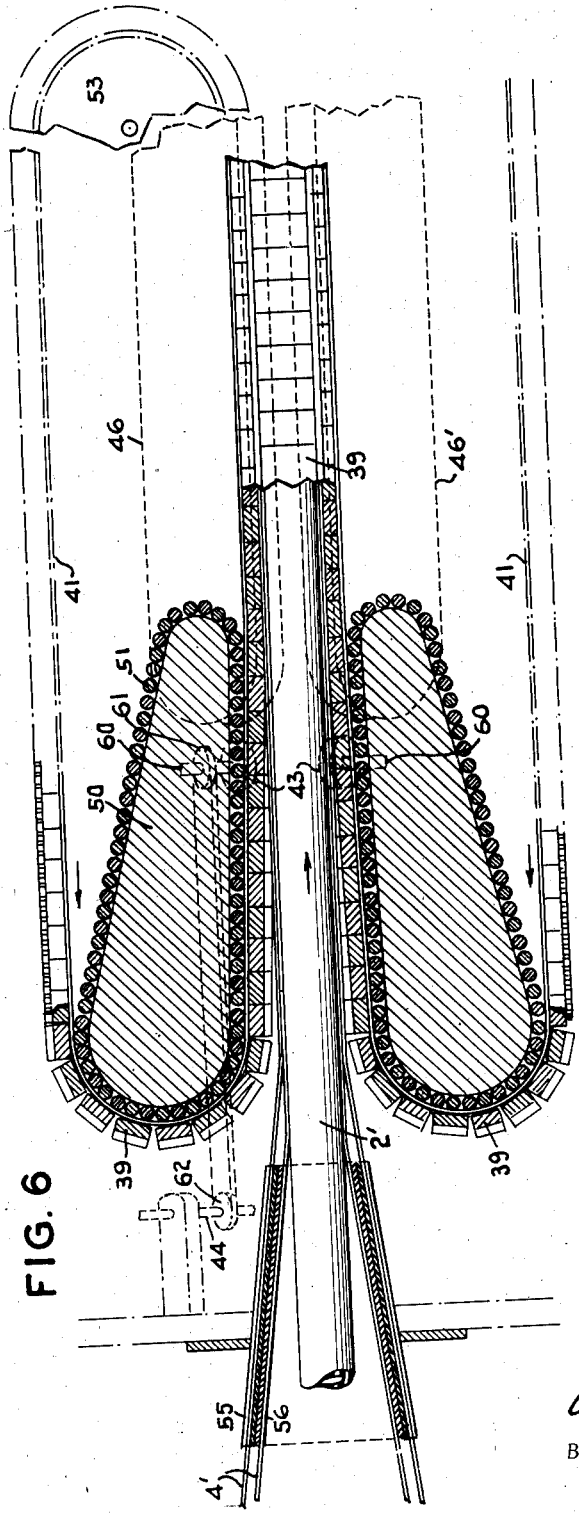
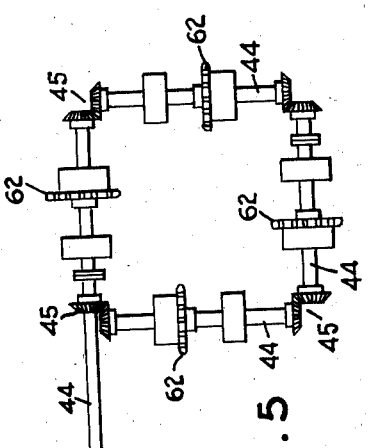
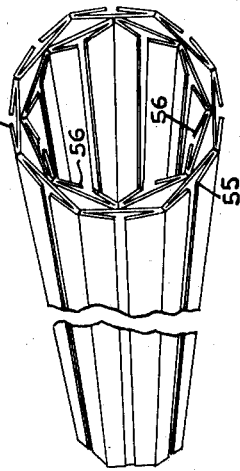
A. L. Wallace  INVENTOR.
BY Thomas Howe  ATTORNEY.

Patented Jan. 16, 1940

2,187,254

UNITED STATES PATENT OFFICE 2,187,254

CONTINUOUS VULCANIZER

Archibald L. Wallace, Northport, N. Y., assignor to Richard H. Crook, trustee

Original application March 16, 1935, Serial No. 11,395. Divided and this application September 3, 1937, Serial No. 162,228

5 Claims. (Cl. 18—6)

This invention relates to vulcanizers for continuously vulcanizing rubber hose, belting and the like. The present application is a division of my application Serial No. 11,395, filed March 16, 1935.

The main object of the present invention is to provide a mechanism which shall efficiently perform the desired vulcanization and which shall be reliable and economical.

A further and more detailed object of the invention is to provide improved means for continuously operating the mold members.

A further object of the invention is to provide improved means for driving the mold member structure.

A further object of the invention is to provide an improved means for clamping the mold members together during the vulcanizing operation and unclamping them so as to permit them to separate during their return to the entrance of the vulcanizer after the vulcanizing operation.

A further object of the invention is to provide a plurality of endless series of mold members and endless series of dogs or clamps cooperating therewith to hold the mold members of the different series in proper relation to compress the work during the time of their action upon the work, but permit the separation of the mold members for return to their entrance positions.

Other and ancillary objects of the invention will appear hereinafter.

In the accompanying drawings which illustrate the invention:

Fig. 5 is an elevational view showing the arrangement of the driving means for driving gears for the mold members.

Fig. 6 is an elevation, partly in section on the line 6—6 of Fig. 2 and partly broken away, showing particularly the manner of operating the mold members, and Fig. 7 is a perspective view, partly broken away, of the guiding means for the steel strips at their entrance into the vulcanizer.

Figure 4:
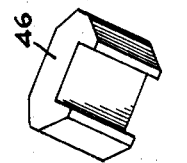
Fig. 4 is a perspective view, on an enlarged scale, of an individual dog or clamping member for securing the mold members of different series together.
Figure 3:
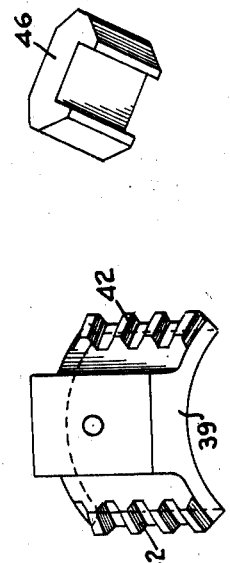
Fig. 3 is a perspective view, on an enlarged scale, of an individual mold member.

Referring to the drawings, there are four endless belts or series 35, 36, 37 and 38 of mold members, each of the mold members 39 having a curved concaved face co-operating with the similar members of the other series to form a tubular encasement during the vulcanizing, for the rubber hose 2' to be vulcanized. At the back of each of the members, opposite the curved face, just referred to, the mold members of each series are secured to an endless flexible metal belt 41 by means of riveting, or in other suitable ways, the molds fitting close together on straight portions of the belt but separating to permit the ready passage of the belt about pulleys or other curves. Also the molds of one series preferably break joints with the molds of adjacent series. Also at the back of each of the mold members, adjacent the marginal edges thereof, are raised gear teeth 42 forming racks, the racks on the mold members of one series co-operating with each other to form continuous racks at the edges of the mold members throughout straight portions of the series and adapted to be continuously driven by two of the gears 43. The adjacent rack teeth of adjacent edges of two series of mold members register with each other so as to form practically one rack which is engaged by one driving gear 43, such driving gear engaging simultaneously with the teeth on the two series.

The gears 43 are each fixed on a rotatable shaft 60 to which is fixed a sprocket wheel 61, the four sprocket wheels 61 being driven by sprocket chains passing about them and the sprocket wheels 62 on the shafts 44 which are rotatably mounted in bearings on a stationary support, those shafts being connected in driving relation by pairs of bevel gears 45 and one of the shafts 44 is extended and may thereby be driven by any suitable driving means such as a motor or the like. The bevel gears 45 are all of the same size so that the sprockets 62 which are of the same size are driven at the same speed, the equal sized sprockets 61 being driven at the same speed and the equal gears 43 are driven at the same speed and turn in a direction to all drive their engaged mold series in the same direction.

Each of the series of mold members 39 at the entrance end of the apparatus passes about a stationary support 50, there being interposed between the steel belt 41 and the support 50 an endless chain of rollers 51 which forms a roller bearing therebetween whereby the ease of passage of the mold series about the support is facilitated. At the other end the series of mold members passes about a supporting pulley 53. The supports 50 are inclined inwardly toward the hose treated, passing from the entrance toward the vulcanizer, whereby the molds of the several series are gradually passed closer together as they move toward the vulcanizer, thereby pressing upon the flexible steel liner strips 4', which exert the desired vulcanizing pressure upon the rubber hose 2'.

To secure the mold members of the several series together after they have been forced to their innermost position and have passed beneath the gears 43, there are provided a plurality of series, in this case four, of clamps or dogs each of which comprise a series of U-shaped dogs or clamps 46 formed into an endless belt or series by being secured at their backs by rivets, or in any other suitable way, to an endless flexible steel belt or strip 47 passing over the pulley 48 at one end and about the pulley 49 at its other end.

Figure 1:
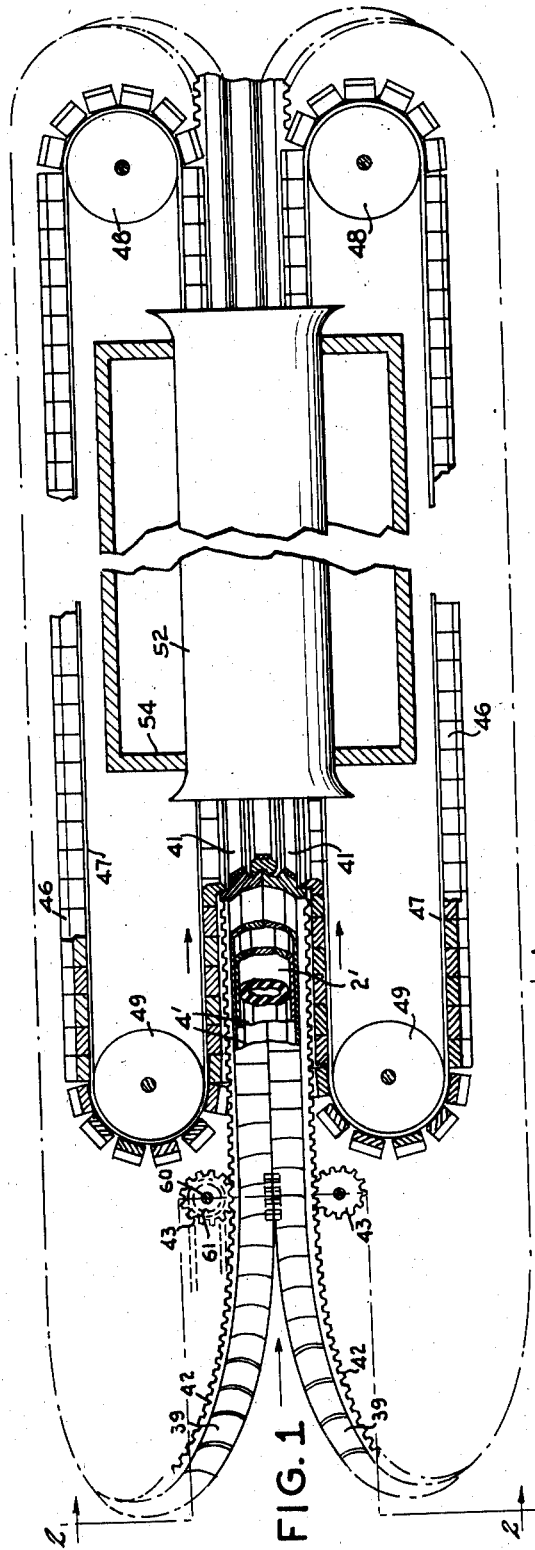
Fig. 1 is an elevation, partly in section on the line 1—1 of Fig. 2 and partly broken away, showing the construction and manner of manipulating the pressure mold members and clamping means therefor in a modified structure of vulcanizing apparatus.
Figure 2:
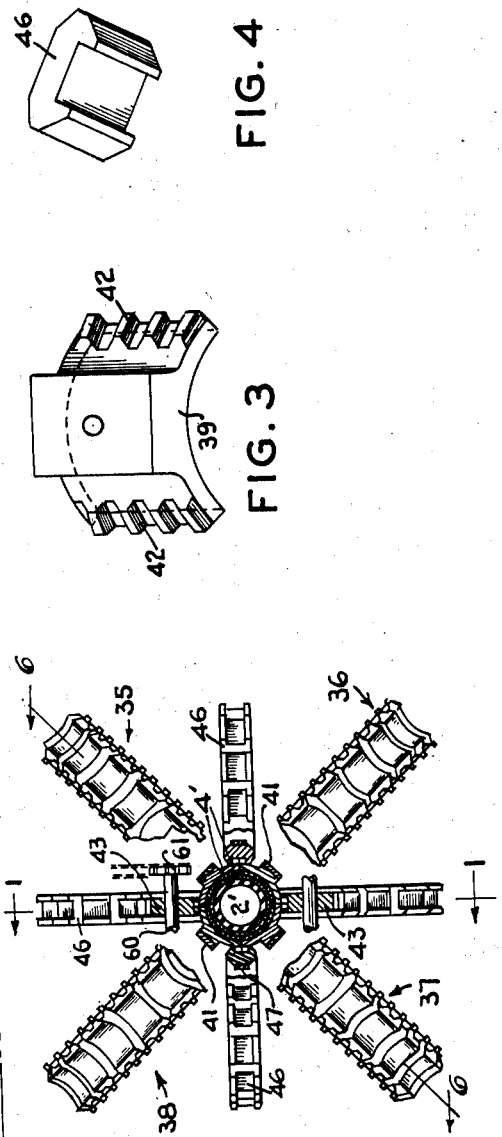
Fig. 2 is an end view looking from the left of Fig. 1, broken away to shown a section on the line 2—2 of that figure and also a transverse section through the hose and its enclosing parts when they are in the relation for the vulcanizing.

The lower course of the endless series 46 of clamps passes adjacent and parallel to the series of mold members and during the vulcanizing operation bridges over two racks at the edges of adjacent mold members and the sides of the grooves in the clamp members fit tightly against the inner sides of the racks so that the mold members of the different series are securely held together during the vulcanizing operation. Such operation having been completed, the series of clamps in passing about the pulley 48 will be moved out of engagement with the series of mold members thus permitting the latter to separate and return to their point of entry into the machine (left in Figs. 1 and 6). The clamps will return across the upper course of their endless series and turn downwardly about the pulley 49 and as they enter the lower course of the series will be successively brought into engagement with the mold members to hold them together as before referred to.

The flexible steel strips 4' are guided into proper relative positions about the hose to be vulcanized by means of the tapered structure (see Figs. 6 and 7) comprising the outer circumferential series of conduits or channels 55 and an inner series of similar conduits or channels 56 secured in position by welding, soldering or in any other suitable way. Each of the channels is formed from a sheet of metal having its edges bent toward each other as shown and the channels of the inner and outer series break joints. One of the strips 4' is passed through each of the channels and is thereby guided into its proper position with relation to the other strips and the hose.

It will now appear that the uncured hose 2' will be fed in between the steel strips 4' at the left (Fig. 6) of the apparatus and will then pass beneath the mold members, that the mold members driven by the gears 43 will be forced down with a desired pressure upon the strips 4' and the uncured hose (by the inclined supports 50) so that the hose and strips will be carried along with the molds as the series of mold members is moved to the right and the hose will be placed under the desired vulcanizing pressure; that shortly before the mold members are pressed to their innermost positions, they will pass under the driving gears 43 and thereafter, when the mold members are at their innermost positions they will be clamped together by the dogs 46 and so held securely together, while they pass through the vulcanizer which may be a metal tube 52 suitably heated by being included in a steam chamber 54 or in other suitable ways; that after the vulcanizing operation has been completed the clamps 46 will separate from the mold members which are permitted to separate and, being arranged in an endless series, they will successively return to the entrance to the apparatus and again pass through the vulcanizing operation with the rubber hose. Also the clamps or dogs for securing the mold members together, being arranged in an endless series, will, after disengaging from the mold members after the vulcanizing operation, return to the left and be successively brought into operation in connection with the mold members. The clamps will ordinarily be carried along with the series of mold members by reason of their frictional engagement therewith but their movement may also be facilitated by applying power to the shaft of the pulley 48 if desired. On account of the endless character of the steel strips, the series of securing dogs and the series of mold members the operation of vulcanizing may be carried on continuously for as long a period as desired, the uncured rubber hose being fed into the entrance end of the apparatus (left of Fig. 6) and the vulcanized hose is discharged from the exit end of the apparatus (right of Fig. 1).

It will be observed that the driving gears 43 push upon the series of mold members in the vulcanizing course and thereby push such mold members together and close up any spaces between them which might otherwise be formed.

While the invention has been illustrated in what is considered its best application, it may be embodied in other structures without departing from its spirit and is not therefore limited to the structures shown in the drawings.

What I claim is:

1. A vulcanizing machine comprising in combination a plurality of parallel but separated series of mold members adapted to receive the material to be vulcanized between them, each of said series comprising a plurality of mold members articulated together and securing dogs mounted separately from said mold members, each engaging with mold members in different series to secure them together.

2. A vulcanizing machine comprising in combination a plurality of parallel endless series of mold members adapted to receive the material to be vulcanized and an endless series of securing dogs articulated together each engaging with mold members in different series to secure them together.

3. A vulcanizing machine comprising in combination a plurality of parallel series of movable mold members adapted to receive the material to be vulcanized between them, gear teeth on said mold members and driving gears engaging with the aforesaid gear teeth and a plurality of series of dogs or clamps embracing rows of gear teeth of a plurality of mold members in different series to secure them together.

4. A vulcanizing machine comprising in combination a plurality of parallel but separated series of mold members adapted to receive the material to be vulcanized between them, each of said series comprising a plurality of mold members articulated together and securing dogs mounted separately from said mold members, each of said dogs engaging with a single mold member in each of a plurality of different series to secure the mold members together.

5. A vulcanizing machine comprising in combination a plurality of parallel endless series of mold members adapted to receive the material to be vulcanized and a series of securing dogs articulated together, each engaging with mold members in different series to secure them together.

ARCHIBALD L. WALLACE.